United States Patent [19]

Gregor et al.

[11] 4,278,301
[45] Jul. 14, 1981

[54] TREAD BELT AND DRIVE HAVING INVOLUTE GEAR DRIVE

[75] Inventors: Robert A. Gregor; Ned L. Morgan, both of New Berlin, Wis.

[73] Assignee: Bucyrus-Erie Company, South Milwaukee, Wis.

[21] Appl. No.: 81,776

[22] Filed: Oct. 4, 1979

Related U.S. Application Data

[63] Continuation-in-part of Ser. No. 863,880, Dec. 23, 1977.

[51] Int. Cl.³ .............................................. B22D 55/20
[52] U.S. Cl. ...................................... 305/11; 305/53; 305/57
[58] Field of Search ...................... 305/11, 28, 21, 53, 305/56, 57, 58 R

[56] References Cited

U.S. PATENT DOCUMENTS

| 1,309,053 | 7/1919 | Adams | 305/57 U X |
|---|---|---|---|
| 1,503,617 | 8/1924 | Wickersham | 305/28 X |
| 2,530,379 | 11/1950 | Davidson | 305/57 X |
| 2,823,082 | 2/1958 | Bauer, Jr. | 305/53 |
| 3,128,130 | 4/1964 | Harris | 305/57 X |
| 3,680,928 | 8/1972 | Kraschnewski et al. | 305/57 |

FOREIGN PATENT DOCUMENTS

| 122085 | 3/1931 | Austria | 305/57 |
|---|---|---|---|
| 818129 | 9/1937 | France | 305/57 |

OTHER PUBLICATIONS

Manitowoc 2300, 1969: Manitowoc Engineering Corp., Manitowoc, Wisconsin.

Primary Examiner—David A. Scherbel
Attorney, Agent, or Firm—Quarles & Brady

[57] ABSTRACT

A tread belt drive system for heavy mobile equipment includes an endless tread belt made up of a plurality of identical links joined together by link connecting pins. Each of the links has a ground engaging bottom and a top having a cog, or cog portion, positioned medially of the link ends, which cog has fore and aft driving surfaces. A pair of longitudinally extending tumbler rim and roller engaging surfaces which extend above the cog are positioned on the top of the link, one on each side of the cog. The links have fore and aft pin connections with the pin center below the engaging surfaces in alignment with the driving surfaces. The drive system also includes rollers which support the weight of the equipment and drive and idler tumblers each having a rim and teeth. The teeth of the driving and idler tumblers are entrapped between the fore and aft driving surfaces of the cogs of adjacent links to drive and guide the endless belt; the rollers and the rims of the tumblers bear on and roll along the engaging surfaces of the links and the link connection pins follow the tumbler rotation on its pitch circle. In a preferred embodiment, the driving surfaces of the cogs have an involute gear profile; and the driving teeth of the tumbler have a matching involute gear profile.

6 Claims, 13 Drawing Figures

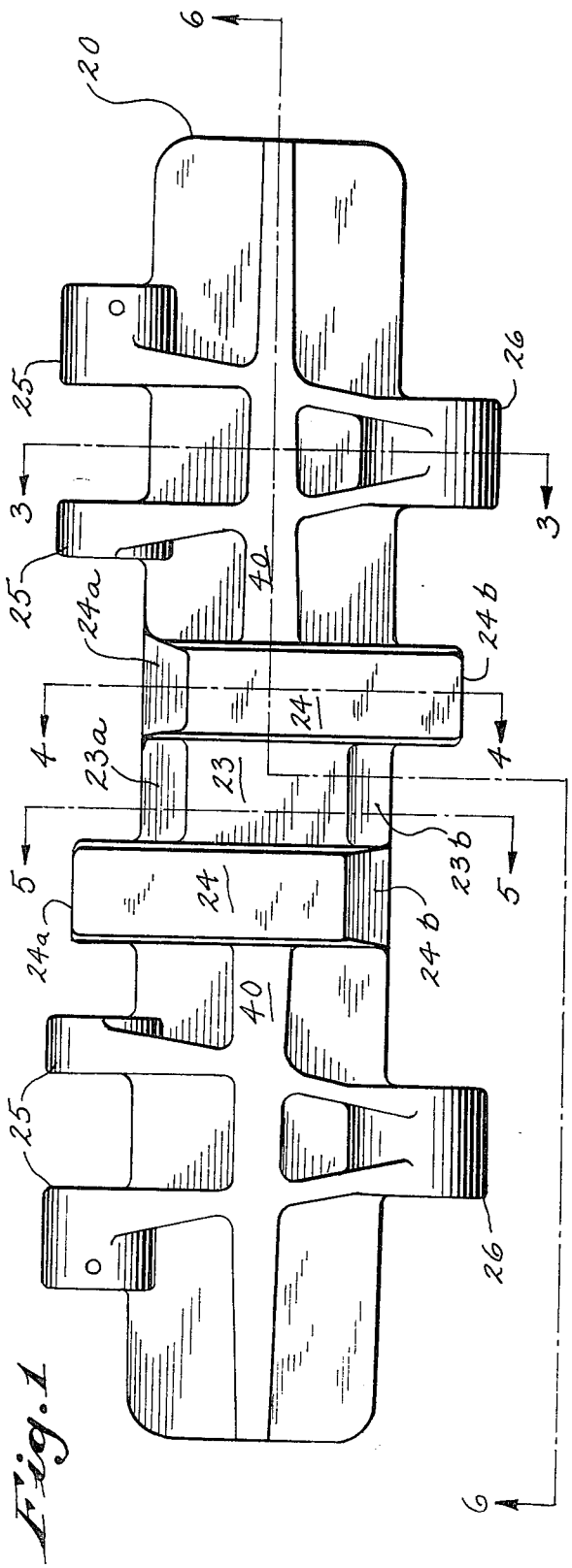
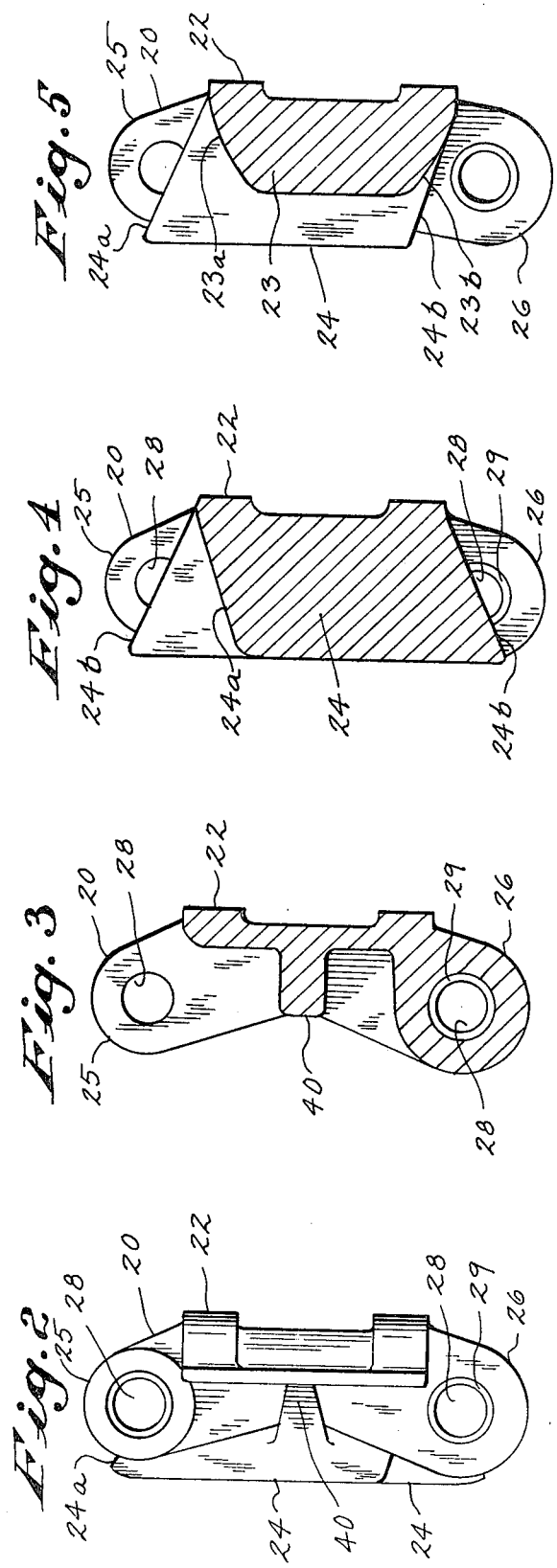

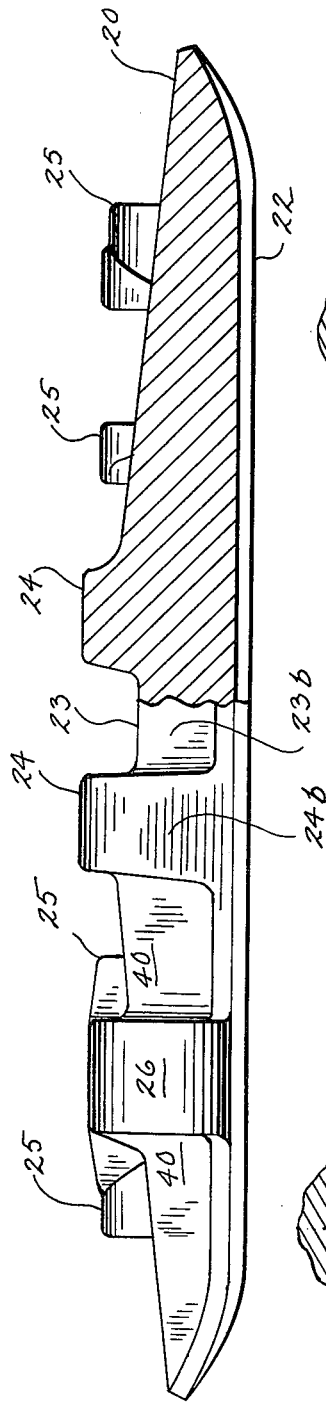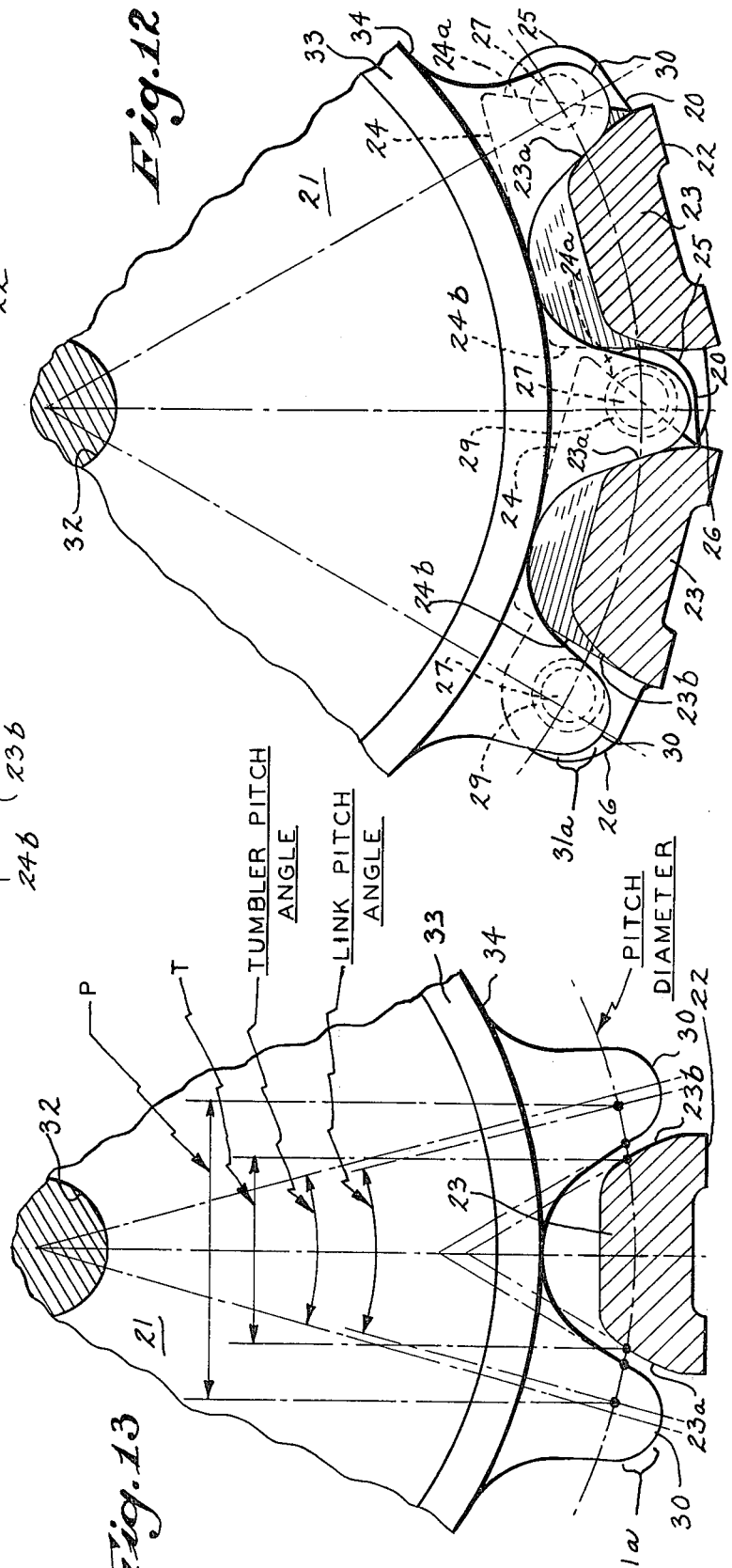

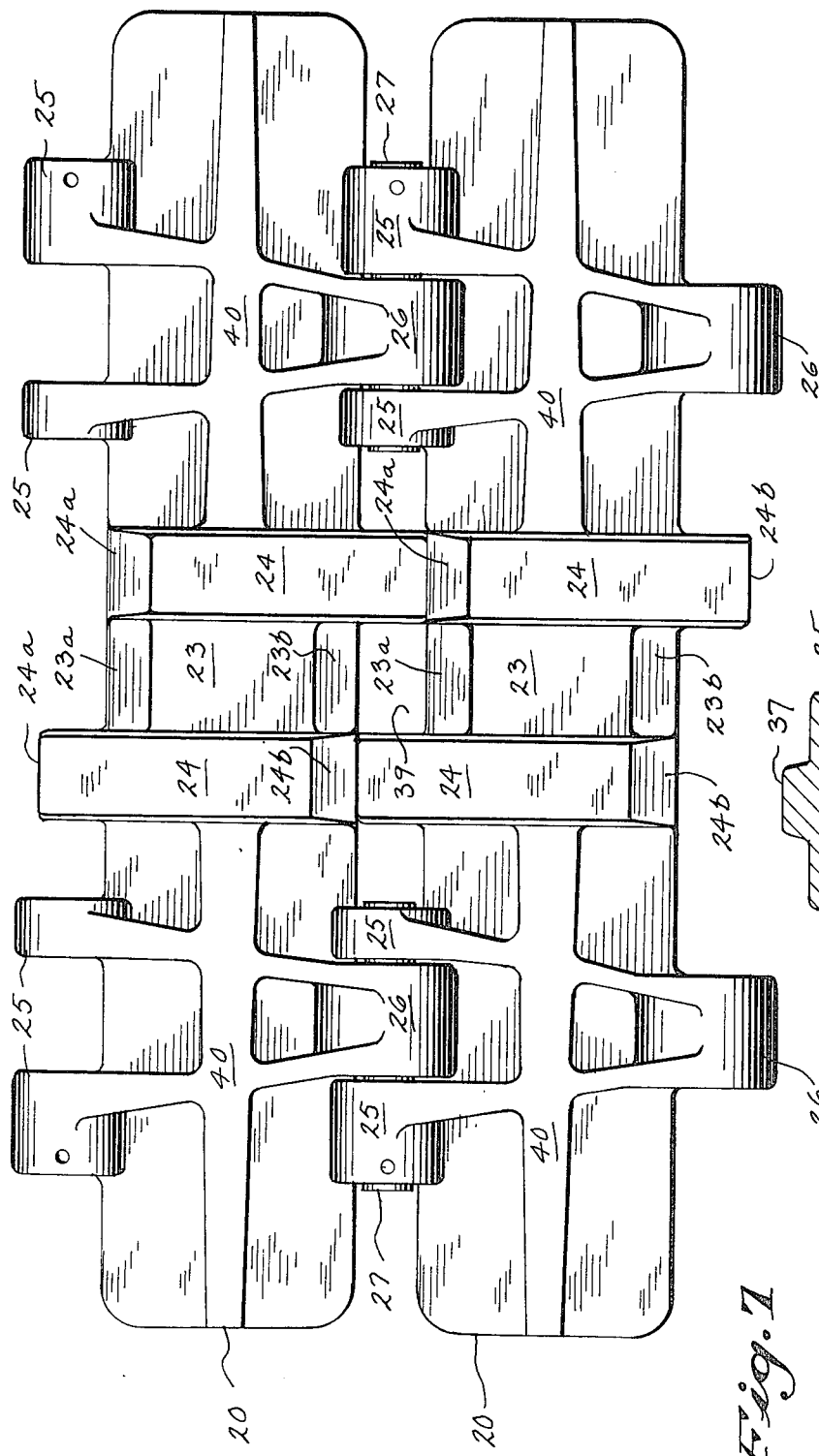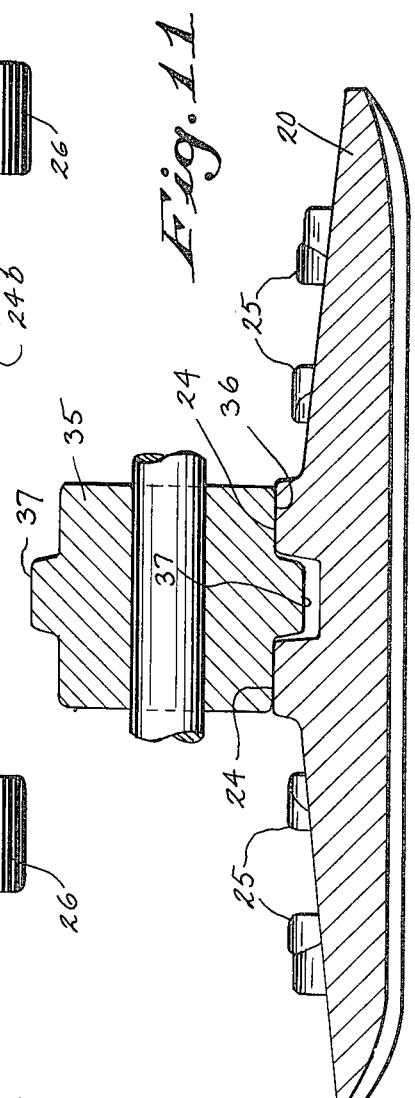
Fig. 1
Fig. 11

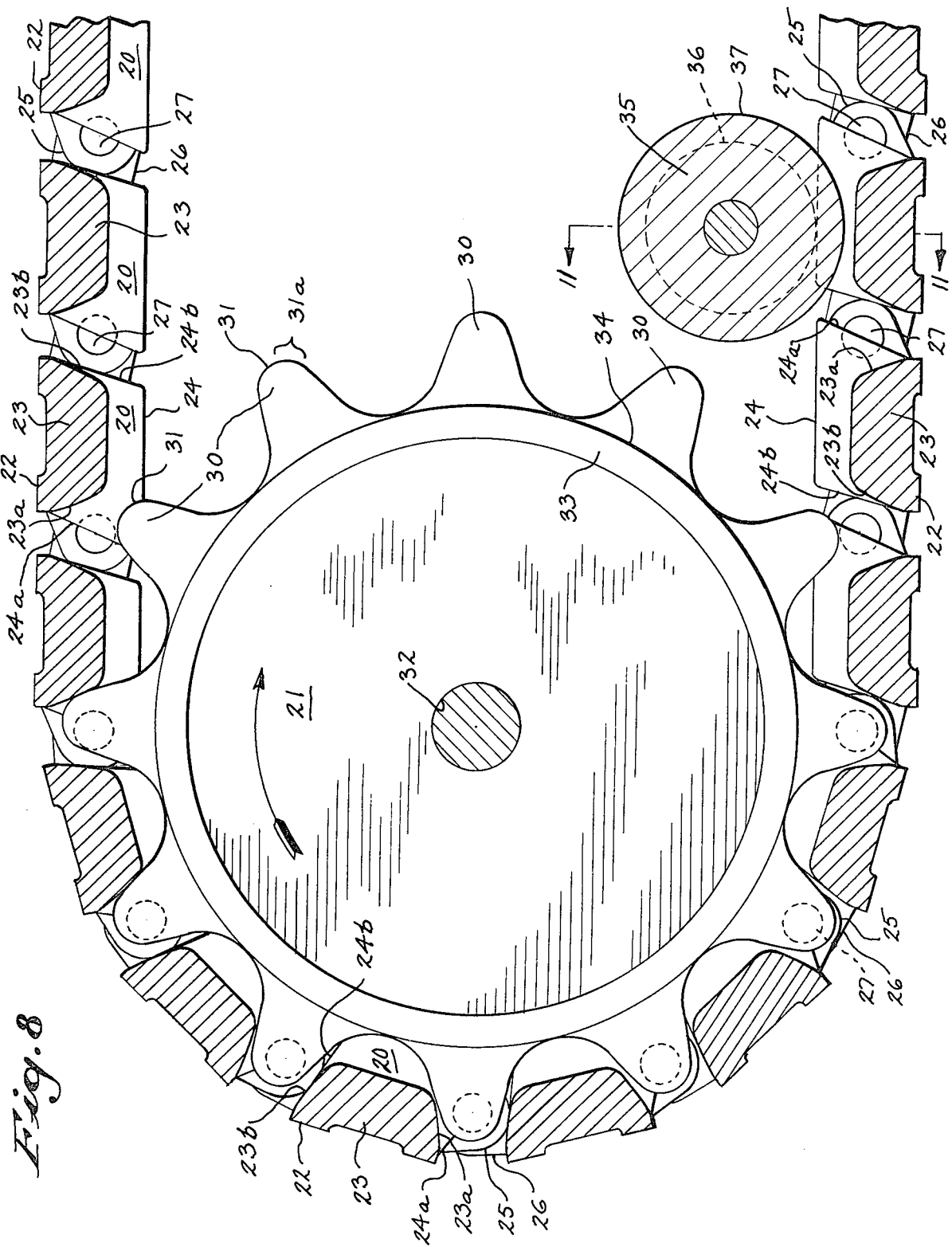

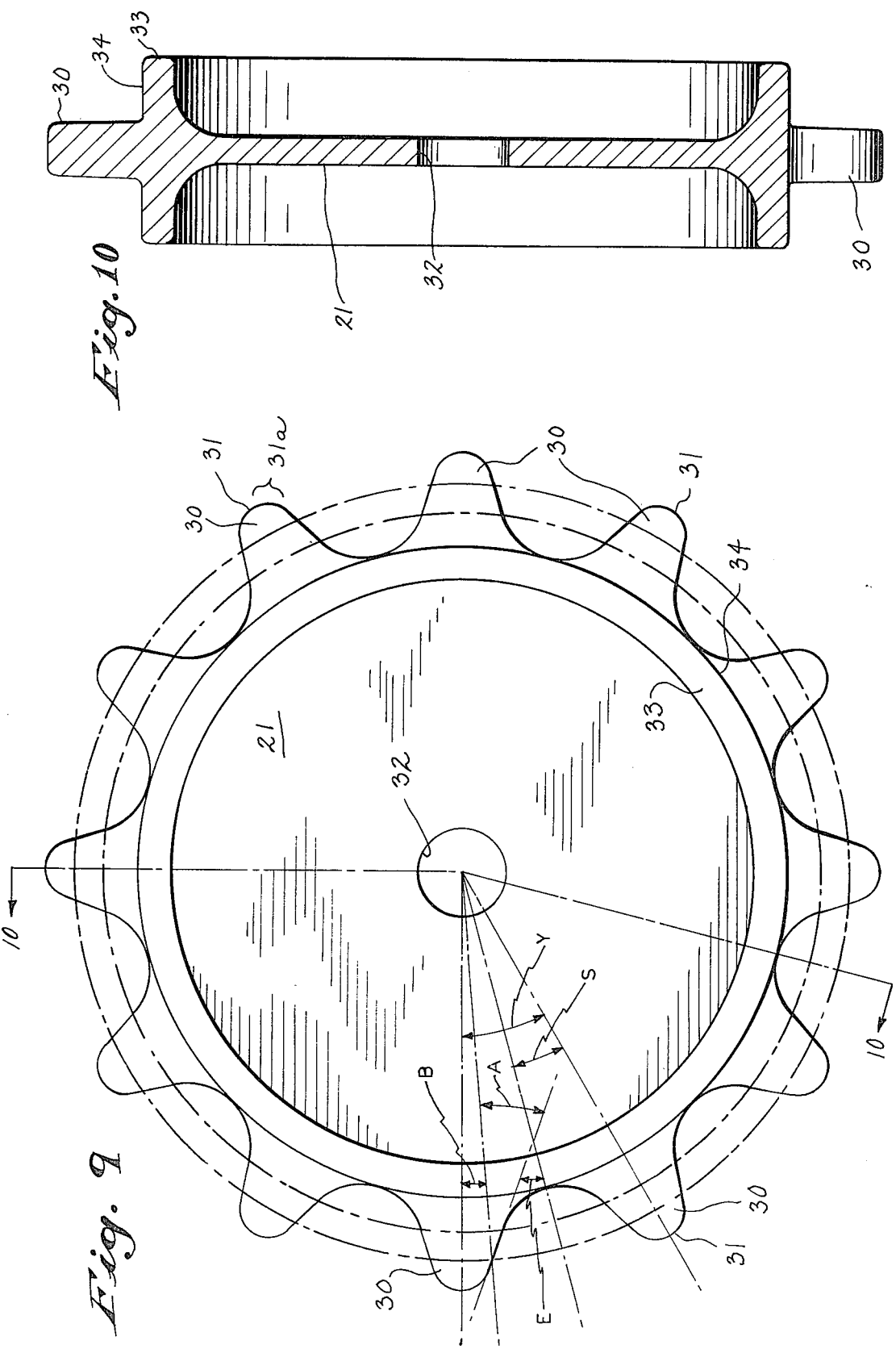

TREAD BELT AND DRIVE HAVING INVOLUTE GEAR DRIVE

The present application is a continuation-in-part of our earlier co-pending application Ser. No. 863,880 filed Dec. 23, 1977 and titled "Tread Belt Drive System."

The present invention relates to a drive system for heavy machinery. More particularly, it relates to a tread belt drive system which includes driving and idler tumblers having teeth and an endless belt made up of identical links wrapped about the tumblers. It also relates to the novel links which are joined together by connecting pins to form the tread belt.

BACKGROUND OF THE INVENTION

Tread belt drives useful for propelling large machinery and other heavy mobile equipment which are forerunners of the present invention are shown in U.S. Pat. Nos. 2,530,379; 2,727,794 and 3,680,928. In those patents a drive system is described in which the number of links which are drive by the tumbler teeth at any given moment of time is less than the number of links which are wrapped about the tumbler. This system has the advantage of providing for even wear of the links and is achieved by having the pitch angle between the tumbler teeth larger than the pitch angle of the links.

The pitch angle of the tumbler teeth is the angle at the center of the tumbler which is subtended by a line drawn from the midpoint of one tooth to the midpoint of an adjacent tooth. The pitch angle of the links is the angle at the center of the tumbler that is subtended by a line drawn from the center of the pivot pin connection of one link to the pivot pin connection of an adjacent link. A detailed discussion of pitch angles and their measurement appears in U.S. Pat. No. 2,727,794.

The described prior art type of tread belt drive system provides a practical and effective way of propelling large excavating equipment. However, the use of such tread belt drive systems is not without problems. One problem which can occur is that of breakage of the links or the teeth of the drive system. This can happen when a link being driven by a tumbler tooth is forced radially outward of the tumbler in response to the driving forces. When this happens there can be a loss of proper driving engagement between the tumbler tooth and the link and as the link falls back towards the tumbler the link may improperly strike a tumbler tooth and cause a fracture of either one or both of the members making repairs necessary.

Another problem which can occur is that due to the wear of the bearing surfaces of the tumbler and the links. Such wear can cause the pitch angle of the links to increase and the pitch angle of the tumbler to decrease. When the pitch angle of the links exceeds the tumbler pitch angle the necessary driving relationship of the tumbler to the links is lost and the links or tumbler must be rebuilt or replaced.

Still another problem which can occur is the jamming or breaking of the tread belt when stones or dirt become lodged between the driving surfaces of the tumbler teeth and the link.

Despite the above described problems and the fact that tread belt drive systems are generally noisy and rough operating, tread belt drive systems remain the most practical way of propelling large excavators and other heavy mobile machinery. Therefore, a need exists for an improved tread belt drive system which provides a smoother, quieter operation and eliminates the problems which accompany the use or prior drive systems.

SUMMARY OF THE INVENTION

The present invention relates to a link for an endless tread belt which link has a ground engaging bottom and a top having a cog positioned medially of the link ends with fore and aft driving surfaces. The top surface of the link also has two longitudinally extending tumbler rim and roller engaging surfaces that extend above the cog and are positioned one on each side of the cog. The link also has fore and aft pin connections with the pin center at a level beneath the roller and tumbler rim engaging surfaces in alignment with the driving surfaces. The invention further relates to a drive system made up of a plurality of links joined together to form an endless belt and which includes equipment and drive and idler tumblers each having a rim and teeth. When the belts are in place, the teeth of the driving tumbler and the idler tumbler are entrapped between the fore and aft driving surfaces of adjacent links to drive and guide the endless belt; the roller and the rims of the tumblers bear on and roll along the tumbler engaging surfaces of the links and the link pin connections follow the tumbler rotation on its pitch circle.

In the preferred embodiment, the driving surfaces of the link cog portion have an involute gear profile and are positioned below the roller and tumbler rim engaging surfaces of the link close to the link bottom and the level of the link connecting pin centers. The teeth of the preferred drive and idler tumblers have matching involute gear profiles so that the points of driving engagement of the teeth with the driving surfaces of the link cog portions remain on the pitch circle or migrate towards the link bottom. As a result, the teeth drive on more links and an unusually smooth drive is obtained because as the link is driven by the tumbler the driving force upon the link does not create excessive torque about the link pins which might otherwise tend to lift the link out of mesh with the tumbler and cause the teeth or the links to be damaged.

In order to accommodate for the inevitable wear of the bearing surfaces of the links which can cause the pitch angle of the links to increase and exceed the tumbler pitch angle, the link pin connections in the preferred form of the link are bushed for link connecting pins and the pins and bushings are hardened with the pin being slightly softer. Then as wear of the pins and bushings occurs and the link pitch angle increases, excessive link tumbler engagement error can be avoided by replacing the link pin and/or the bushings to once again obtain the correct link pitch angle.

The possibility of a tread belt of the preferred links being jammed or broken is reduced because an endless belt of the preferred links is self-cleaning. As the belt of preferred links travels about the tumblers the teeth of the tumblers enter between the links and the distance between the link bottoms is increased due to the angle between the links and the tumbler teeth so that any stones or dirt lodged between the driving surfaces of the tumbler teeth and the links are removed.

In addition to its other advantages an endless belt of the preferred links provides a smoother operating tread belt drive system because the roller and tumbler rim engaging surfaces are constructed so that when the links are joined together a nearly continuous roller and tumbler rim engaging surface is provided. The engaging surfaces extend longitudinally fore and aft of the link edges so that when the links are joined together the openings between the tumbler and roller engaging surfaces of adjacent links are staggered on opposite sides of the cog portion so that a tumbler rim or a roller will not run over openings on both sides of the cog at the same time. The use of teeth of an involute gear profile and cogs with driving surfaces of a matching involute gear profile results in a gear and rack type action which results in a smoother more efficient operating drive system than previously available.

The foregoing and further advantages of the invention will appear from the following description. In the description reference is made to the drawings which form a part hereof and in which there is shown by way of illustration and not limitation a preferred embodiment of the invention.

DESCRIPTION OF THE DRAWINGS

FIG. 1 is a plan view of the preferred tread belt link of the present invention;

FIG. 2 is an end view of the link of FIG. 1;

FIG. 3 is a view in cross section of the tread belt link of FIG. 1 taken on the plane 3—3;

FIG. 4 is a view in cross section of the tread belt link of FIG. 1 taken on the plane 4—4;

FIG. 5 is a view in cross section of the tread belt link of FIG. 1 taken on the plane 5—5;

FIG. 6 is a transverse view of the tread belt link of FIG. 1 with parts broken away and in section so as to have a portion thereof viewed through the plane 6—6 indicated in FIG. 1;

FIG. 7 is a plan view of two tread belt links connected;

FIG. 8 is a partial view of the drive system showing the link belt and the tumbler teeth of the drive tumbler in mesh;

FIG. 9 is a view of the drive or idler tumbler;

FIG. 10 is a view in cross section of the drive or idler tumbler of FIG. 9 taken on the plane 10—10;

FIG. 11 is a view in cross section of the tread belt link and roller shown in FIG. 8 taken on the plane 11—11;

FIG. 12 is a view of the link and the idler tumbler with engaging surfaces in contact;

FIG. 13 is a view of the link cog and a tumbler tooth geometry.

DESCRIPTION OF THE PREFERRED EMBODIMENTS

In the drawing a tread belt link 20 is shown which can be used in a drive system for mobile machinery. A number of such links 20 may be joined together to form endless ground engaging tread belts and a tread belt is disposed on each side of a machine such as an excavator or tractor. The endless belt passes under rollers that support the machine proper and is in mesh with a drive tumbler 21 as seen in FIG. 8, which is located at one end of the belt and an idler tumbler (not shown) at the other end of the belt to provide a drive system for propelling the machine along the ground.

For purposes of description, the direction of travel of the links will be called "longitudinal" and the direction across the link from one end to the other end will be called "transverse". To further facilitate description, the ground engaging surface 22 of the link 20 will be termed the "bottom" of the link and the direction through the link from the ground engaging surface 22 will be termed "upward" even though some of the links will be oriented in use so that the upward direction will actually point towards the ground.

Referring now to FIGS. 1-7, it is seen that the top of the link 20 has a cog or cog portion 23 which is positioned medially of the link ends and a pair of upwardly facing, flat tumbler rim and roller engaging surfaces 24 which are located on each side of and directly adjacent to the cog portion 23. The surfaces 24 extend longitudinally across the top of the link 20. The link 20 is further provided with a set of four connecting ears 25 which extend forward of the front edge of the link. A pair of the connecting ears 25 are located on each side of the cog portion 23 between the tumbler rim and roller engaging surfaces 24 and the ends of the link. There is also a second set of connecting ears 26 which extend rearward of the back edge of the link. One of each of ears 26 is transversely centered between two of the opposite ears 25.

The links 20 are connected to one another to form an endless belt by the connecting ears 26 of one link being interdigited with the connecting ears 25 of the succeeding adjacent link and appropriate pins 27 inserted in the openings to join the links together as seen in FIG. 7. As seen best in FIG. 3, the connecting ears 25 and 26 are provided with pin openings 28 and the connecting ears 26 are provided with bushings 29. The connecting pins 27 are removably secured to the ears 25. The connecting pins 27 are sized to have relative movement within the bushing 29 of the ear 26 and the bushings 29 are designed to be replaced as they wear to re-obtain the correct link pitch angle. The connecting pins 27 of the link 20 have no relative motion within the ears 25, and as a result, the pin holes 28 in ears 25 will not wear, thus the simple replacement of the pins 27 and/or bushings 29 will correct any link pitch angle error that may be due to wear.

The endless belt of links 20 is mounted on a pair of spaced apart tumblers 21 on the machine with the teeth 30 of the tumblers 21 entrapped between the cogs 23 of adjacent links 20 as seen in the partial view of the drive system in FIG. 8 in which only the drive tumbler is shown. The drive tumbler is mounted on the machine proper to be driven in a rotational direction to drive the belt and idler tumblers (not shown) mounted in such a manner as to be driven by the belt. The drive and idler tumblers 21 of the machine are of similar configuration. Both of the tumblers 21 are provided with a central shaft receiving opening 32 and a rim 33 which extends continuously about the opening 32 and presents a radially outward facing rolling surface 34 (seen best in FIG. 10). Protruding radially outward from the rolling surfaces 34 is a plurality of teeth 30 that are spaced circumferentially from one another to form a gear wheel. As seen in FIG. 8 the machine is supported by rollers 35 which also roll along and bear upon the surfaces 24.

Turning to FIG. 11, it is seen that the preferred roller 35 has a rolling surface 36 that rolls along and bears upon the link surfaces 24 and a roller flange 37. The top of the cog 23 is lower than the uppermost surfaces of the tumbler rim and roller engaging surfaces 24 of the link thus allowing the roller flange 37 to guide the endless belt. Referring to FIG. 12, which is a partial view of the idler tumbler, it is seen that it is the rolling surface 34 of the tumbler 21 which rolls along and bears upon the tumbler rim and roller engaging surfaces 24 of the link 20.

Having completed a general description of the tread belt drive mechanism of the present invention, the links and tumblers of the especially preferred embodiment will now be described.

Turning first to FIGS. 1 and 5, it can be seen that the cog 23 is an integral part of the link 20 that commences at the ground engaging surface 22 and extends upward. The cog 23 has its greatest longitudinal length at the bottom of the link and tapers in an upward direction. The taper is comprised of fore and aft driving surfaces 23a and 23b, which are of an involute gear rack type profile which is dependent on the involute gear profile of the preferred tumbler teeth.

The incline of the driving surfaces 23a and 23b of the link 20 is determined by the angle E seen only in FIG. 9. The angle E is measured between the intersection of the lines defining angles S and A. S is an angle equal to one-half of the pitch angle Y of the tumbler which is an angle measured between the midpoint of two adjacent teeth of the tumbler having its apex at the center of the tumbler. A is the angle equal to the pressure angle of the involute formed tooth 30 (e.g., in a 20% involute, the angle A would be 20°). A is measured off the line created by angle B as shown in FIG. 9. B is an angle having its apex at the center of the tumbler which is measured from the center of a tooth to the point on the edge of the tooth on the tumbler pitch circle. Angle B varies with changes in tooth thickness. The angle A originates on the tooth pitch circle that angle B was measured to.

Referring now to FIG. 13, it can be seen that the thickness T of the cog portion 23 of the link 20 is measured longitudinally between the driving surfaces 23a, 23b and from points originating on the tumbler pitch circle with the engaging surface 24 of the link in contact with the tumbler rim rolling surface 34. This thickness T and distance P between the center of connecting pins of the link are determined together so as to allow the tumbler tooth 30 to be in contact with the cog driving surfaces 23a and 23b at the proper time and to minimize the travel distance of the tumbler tooth 30 from the cog driving surfaces 23a and 23b when the direction of the tumbler rotation is reversed. A detailed description of the measurement and significance of the link pitch angle and the tumbler pitch angle which are shown in FIG. 13 can be found in U.S. Pat. No. 2,727,794.

In the preferred embodiment of the links 20 the tumbler rim and roller engaging surfaces 24 extend from a face 24a to an extension face 24b, which extends beyond the link edge. This is seen best in FIGS. 1, 2, 4, 5 and 7. As seen in FIGS. 4 and 5, the faces 24a and 24b extend upwardly from the ground engaging surface 22 the full depth of link 20 to the surface 24. Thus, when two links 20 are attached to one another as part of an endless tread belt as shown in FIG. 7, the tumbler and roller engaging surfaces 24 of adjacent links present a nearly continuous surface for engagement with the tumbler rim rolling surfaces 34 and rollers 35 under which the links pass. The nearly continuous path of tumbler and roller engaging surfaces formed by the adjacent links is interrupted by the spaces (not seen) between the faces 24a and 24b of adjacent links. The spaces between the faces 24a and 24b of adjacent links are staggered on opposite sides of the cog 23 so that the tumbler rolling surface 34 does not run over the spaces on both sides of the cog 23 at the same time simultaneously. As a result, a smoother more efficient operation is obtained.

Returning to FIGS. 1 to 7, it is seen that in the preferred link a reinforcing rib 40 extends from each of the tumbler rim and roller engaging surfaces 24 to end of the link to provide additional strength and durability.

In the especially preferred tread belt drive system of the invention the tumbler teeth 30 are formed with an involute gear profile from the base circle radially outward to the tooth tip 31. The tooth 30 is also provided with a tip relief cut 31a to eliminate the interference between the tooth 30 and the cog driving faces 23a or 23b as the link 20 leaves the tumbler 21 as shown at the top of FIG. 8. The tip relief 31a of the tooth reduces wear, as the tooth 30 does not slide appreciably along the link 20 as it leaves its tumbler. The use of an involute gear profile allows the tooth 30 to contact the link at a point below the surface 24 and to drive the link 20 on the pitch circle as shown in FIG. 8.

Referring still to FIG. 8, it can be seen that distance between the trailing edge of one link and the leading edge of the successive link is increased as the links 20 pass around the tumbler 21 as compared to the distance between the link edges when the links 20 are on the ground. As the link distance is increased as the links 20 are guided onto the tumbler 21 and the tumbler tooth 30 enters the space 39 (seen in FIG. 7) between the links, foreign material, such as stones and the sort, are ejected from between the links. This removal of foreign material is not as easily accomplished with conventional chain driven links as the material is forced into the chain and is retained by the bolted link to the chain. The same problem of foreign material removal is present in systems using conventional excavator links where the driving tang is located at the top of the link.

When the proper pitch angles are employed with components of the proper dimensions, the link connecting pins 27 are located on the tumbler pitch circle when the tumbler rim engaging surfaces 24 and the tumbler rolling surfaces 34 are in contact (best seen in FIG. 12). As a given link 20 moves about the driving tumbler to the top of the tumbler 21 and to the point of driving action (the arrow seen in FIG. 8), the link 20 tends to follow the pitch circle. Since the point of driving action and the pin centers are below the tumbler rolling surface 24 the links 20 are urged to briefly follow the tumbler rotation on the pitch circle as the link breaks contact with associated tumbler teeth 30 and starts its run to the opposite end of the endless link belt. As a result, the link belt and teeth remain in proper mesh, and the problems of breakage that can occur when they are out of mesh are eliminated.

It will be readily apparent to those skilled in the art that the novel tread belt drive system described provides a smoother more efficient operation than that obtained with conventional tread belts and tumbler arrangements.

Although an especially preferred embodiment has been described in which the driving surfaces of the link have an involute gear rack profile and the driving teeth of the tumbler have an involute gear profile the invention is not so limited. For example, there may be some applications in which it may be desirable to dispense with the use of involute gear profiles and retain the other desirable features of the link and drive systems or to make other changes. Therefore, the invention is not to be limited by the illustrative description, but only by the claims which follow.

We claim:

1. A tread belt link includes a link body having a ground engaging bottom surface and a top having a cog positioned medially of the link ends, said cog having fore and aft driving surfaces, a pair of longitudinally extending tumbler rim engaging surfaces on top of the link, one on each side of the cog and above the driving surfaces of the cog, one of said tumbler engaging surfaces extending from the cog forward of the main body of the link and the other extending from the cog to the rear of the main body of the link and connection fingers extending fore and aft of the main body of the link, said fingers having connecting pin receiving openings so that a plurality of links can be aligned and joined together by inserting connecting pins into the interdigited fingers of adjacent links to form an endless chain in which the tumbler rim engaging surfaces form tracks in which the spaces between the tumbler rim surfaces of adjacent links are staggered so that a tumbler rim rolling over said tracks will not pass over a space between adjacent links on both sides of the cog simultaneously.

2. A tread belt link of claim 1 in which the driving surfaces of the cog have an involute gear profile.

3. The tread belt link of claim 2 in which there are two pair of fingers extending forward of the main body of the link and one pair extending aft.

4. The link of claim 3 in which the tumbler rim engaging surface is flat.

5. A tread belt link having a link body including:

(a) a ground engaging bottom surface and a top, (b) a cog positioned on the top intermediate the ends of said link, said cog having fore and aft driving surfaces having an involute gear profile, (c) a pair of flat tumbler rim engaging surfaces on top of said link, one of said tumbler rim engaging surfaces being positioned on each side of the cog and rising above the driving surfaces of the cog, one of said tumbler rim engaging surfaces commencing adjacent the cog and extending forward past the main body of the link and the other commencing adjacent the cog and extending rearward of the link, and (d) connecting fingers extending forward and aft of the main body of the link, said fingers having connecting pin receiving openings so that when a plurality of links are aligned with the fingers interdigited connecting pins can be inserted into the openings in the fingers to form the links into an endless belt.

6. The tread belt link of claim 5 in which the link has two pairs of fingers extending forward of the main body of the link and one pair extending aft.

* * * * *